(12) United States Patent
Meyer et al.

(10) Patent No.: US 12,008,681 B2
(45) Date of Patent: Jun. 11, 2024

(54) SYSTEMS AND METHODS FOR TESTING VEHICLE SYSTEMS

(71) Applicant: GM GLOBAL TECHNOLOGY OPERATIONS LLC, Detroit, MI (US)

(72) Inventors: Robert Meyer, Highland, MI (US); Samuel Latto, Detroit, MI (US)

(73) Assignee: GM TECHNOLOGY OPERATIONS LLC, Detroit, MI (US)

( * ) Notice: Subject to any disclaimer, the term of this patent is extended or adjusted under 35 U.S.C. 154(b) by 163 days.

(21) Appl. No.: 17/658,281

(22) Filed: Apr. 7, 2022

(65) Prior Publication Data

US 2023/0326091 A1 Oct. 12, 2023

(51) Int. Cl.
| | |
|---|---|
| *G06T 11/00* | (2006.01) |
| *G06T 3/40* | (2006.01) |
| *G06V 20/40* | (2022.01) |
| *G06V 20/58* | (2022.01) |
| *H04N 23/54* | (2023.01) |

(52) U.S. Cl.
CPC ............... *G06T 11/00* (2013.01); *G06T 3/40* (2013.01); *G06V 20/40* (2022.01); *G06V 20/58* (2022.01); *H04N 23/54* (2023.01)

(58) Field of Classification Search
CPC ........... G06T 11/00; G06T 3/40; G06V 20/58; G06V 20/40; H04N 23/54
See application file for complete search history.

(56) References Cited

U.S. PATENT DOCUMENTS

| | | | | |
|---|---|---|---|---|
| 5,319,394 A | * | 6/1994 | Dukek | G08G 1/137 |
| | | | | 348/148 |
| 7,265,821 B1 | * | 9/2007 | Lawrence | G01B 11/2755 |
| | | | | 356/139.09 |
| 9,201,421 B1 | * | 12/2015 | Fairfield | B60W 40/04 |
| 9,330,319 B2 | * | 5/2016 | Jeon | G06T 7/73 |
| 9,384,402 B1 | * | 7/2016 | Furman | B60R 11/04 |
| 9,412,203 B1 | * | 8/2016 | Garcia, III | H04N 7/181 |
| 9,495,874 B1 | * | 11/2016 | Zhu | B60W 60/00133 |
| 9,596,395 B1 | * | 3/2017 | Hines | G03B 15/05 |
| 9,612,123 B1 | * | 4/2017 | Levinson | G05D 1/6987 |
| 9,858,639 B2 | * | 1/2018 | Zhang | H04N 23/698 |
| 9,908,482 B1 | * | 3/2018 | Falstrup | H04N 13/221 |
| 10,266,124 B2 | * | 4/2019 | Nakano | B60R 11/04 |
| 10,286,908 B1 | * | 5/2019 | Wengreen | G06V 20/588 |
| 10,311,636 B1 | * | 6/2019 | Falstrup | G06T 19/003 |
| 10,491,785 B1 | * | 11/2019 | Arnot | H04N 5/2222 |

(Continued)

*Primary Examiner* — Charles L Beard
(74) *Attorney, Agent, or Firm* — Lorenz & Kopf, LLP (57) ABSTRACT

Systems and methods of testing a vehicle system. The systems and methods generate a simulation of a driving scenario to provide simulation video data, display the simulation on a monitor using the simulation video data, capture the displayed simulation using a camera system of the vehicle system to provide video data, process the video data using a perception algorithm to detect and track objects in the video data to provide perception data, control a vehicle actuator of the vehicle system in response to the perception data to provide command data, and adapt the simulation based on the command data. The camera system has a field of view and the monitor has a viewable area. The simulation of the driving scenario is scaled in proportion to a ratio of the field of view of the camera projected onto the monitor and dimensions of the viewable area.

12 Claims, 10 Drawing Sheets

(56) References Cited

U.S. PATENT DOCUMENTS

| | | | | |
|---|---|---|---|---|
| 10,596,980 | B2* | 3/2020 | Uchiyama | B60R 1/00 |
| 10,742,969 | B1* | 8/2020 | Rohatgi | H04N 17/002 |
| 10,748,440 | B1* | 8/2020 | Kitain | G09B 9/302 |
| 10,785,474 | B1* | 9/2020 | Semansky | G06V 20/56 |
| 10,796,453 | B1* | 10/2020 | Yan | B60R 11/04 |
| 10,911,745 | B2* | 2/2021 | Shivalingappa | B60R 1/00 |
| 11,493,922 | B1* | 11/2022 | Avram | G01S 13/931 |
| 11,526,721 | B1* | 12/2022 | O'Malley | G06F 30/15 |
| 11,691,634 | B1* | 7/2023 | Zhou | B60W 50/0097 |
| | | | | 701/93 |
| 11,715,180 | B1* | 8/2023 | Chen | B60R 1/12 |
| | | | | 382/106 |
| 11,741,274 | B1* | 8/2023 | Crego | G06N 20/00 |
| | | | | 703/8 |
| 11,747,453 | B1* | 9/2023 | Shepard | G01S 7/497 |
| | | | | 356/5.01 |
| 11,776,163 | B1* | 10/2023 | Cardei | G06F 17/16 |
| | | | | 382/165 |
| 11,780,466 | B1* | 10/2023 | Shah | G06F 18/213 |
| | | | | 701/23 |
| 11,797,836 | B1* | 10/2023 | Evans | G01S 17/931 |
| 11,801,864 | B1* | 10/2023 | Arora | B60W 60/0011 |
| 11,804,050 | B1* | 10/2023 | Milletari | G06N 3/063 |
| 11,807,256 | B2* | 11/2023 | Herman | G01S 13/931 |
| 11,809,178 | B2* | 11/2023 | Lockwood | G08G 1/20 |
| 2009/0018712 | A1* | 1/2009 | Duncan | G09B 19/167 |
| | | | | 701/2 |
| 2010/0259615 | A1* | 10/2010 | Yamamoto | B60R 1/00 |
| | | | | 348/148 |
| 2011/0175752 | A1* | 7/2011 | Augst | B60R 1/00 |
| | | | | 340/905 |
| 2011/0249963 | A1* | 10/2011 | Cramer | F16M 11/041 |
| | | | | 396/325 |
| 2014/0232538 | A1* | 8/2014 | Sobue | B60R 1/00 |
| | | | | 340/435 |
| 2014/0322674 | A1* | 10/2014 | Livneh | G09B 9/40 |
| | | | | 434/30 |
| 2015/0042799 | A1* | 2/2015 | Zhang | G06V 20/58 |
| | | | | 348/148 |
| 2015/0104757 | A1* | 4/2015 | Moncrief | G09B 9/05 |
| | | | | 434/30 |
| 2015/0109444 | A1* | 4/2015 | Zhang | B60Q 9/008 |
| | | | | 348/148 |
| 2015/0248131 | A1* | 9/2015 | Fairfield | G05D 1/0011 |
| | | | | 701/2 |
| 2015/0373263 | A1* | 12/2015 | Georgiev | G06T 3/4038 |
| | | | | 348/218.1 |
| 2016/0127646 | A1* | 5/2016 | Osborne | H04N 23/6812 |
| | | | | 396/55 |
| 2016/0216105 | A1* | 7/2016 | Sakamoto | G01B 11/272 |
| 2016/0286225 | A1* | 9/2016 | Georgiev | G02B 17/023 |
| 2016/0318458 | A1* | 11/2016 | Wato | H04N 23/51 |
| 2016/0357188 | A1* | 12/2016 | Ansari | G06T 17/00 |
| 2016/0370801 | A1* | 12/2016 | Fairfield | G05D 1/0088 |
| 2016/0381323 | A1* | 12/2016 | Garcia, III | G06T 11/60 |
| | | | | 348/38 |
| 2017/0094251 | A1* | 3/2017 | Wolke | G06T 7/593 |
| 2017/0158134 | A1* | 6/2017 | Shigemura | H04N 7/181 |
| 2017/0277181 | A1* | 9/2017 | Fairfield | B60W 60/00253 |
| 2018/0033328 | A1* | 2/2018 | Whiteford | G09B 9/307 |
| 2018/0136321 | A1* | 5/2018 | Verghese | G01S 7/484 |
| 2018/0178926 | A1* | 6/2018 | Louviot | B64D 45/00 |
| 2018/0182261 | A1* | 6/2018 | Naouri | G09B 19/167 |
| 2018/0184078 | A1* | 6/2018 | Shivalingappa | B60R 1/00 |
| 2018/0330175 | A1* | 11/2018 | Corcoran | G06V 10/147 |
| 2018/0330632 | A1* | 11/2018 | Fonarov | A63H 30/04 |
| 2018/0362053 | A1* | 12/2018 | Isa | G02B 27/00 |
| 2018/0366090 | A1* | 12/2018 | Shatzki | G09G 5/38 |
| 2019/0009175 | A1* | 1/2019 | Buxton | A63F 13/213 |
| 2019/0061742 | A1* | 2/2019 | Kubo | G06V 20/58 |
| 2019/0104285 | A1* | 4/2019 | Medvec | H04N 9/3141 |
| 2019/0220029 | A1* | 7/2019 | Fukuhara | G06F 18/2185 |
| 2019/0287303 | A1* | 9/2019 | Falstrup | G06F 3/0485 |
| 2019/0302761 | A1* | 10/2019 | Huang | G05D 1/0016 |
| 2019/0303759 | A1* | 10/2019 | Farabet | G06F 9/455 |
| 2019/0325595 | A1* | 10/2019 | Stein | G06V 10/764 |
| 2019/0329721 | A1* | 10/2019 | Okuda | G02B 13/02 |
| 2019/0379841 | A1* | 12/2019 | Hardy | G06T 7/70 |
| 2019/0383631 | A1* | 12/2019 | Bigio | G06V 20/59 |
| 2020/0019160 | A1* | 1/2020 | McArthur | G01S 13/865 |
| 2020/0059583 | A1* | 2/2020 | Tamura | H04N 23/54 |
| 2020/0068434 | A1* | 2/2020 | Pedersen | G06T 1/0007 |
| 2020/0084868 | A1* | 3/2020 | Bonne | H05B 45/20 |
| 2020/0184684 | A1* | 6/2020 | Ma | G06T 7/174 |
| 2020/0218910 | A1* | 7/2020 | Herman | G06V 20/20 |
| 2020/0226225 | A1* | 7/2020 | Zaytsev | H04W 4/40 |
| 2020/0267333 | A1* | 8/2020 | Li | G06T 3/40 |
| 2020/0294194 | A1* | 9/2020 | Sun | H04N 23/698 |
| 2020/0314333 | A1* | 10/2020 | Liang | H04N 7/181 |
| 2020/0355831 | A1* | 11/2020 | Gassend | G01S 17/10 |
| 2020/0409369 | A1* | 12/2020 | Zaytsev | G06F 9/455 |
| 2020/0410715 | A1* | 12/2020 | Cadien | G01S 13/867 |
| 2021/0026887 | A1* | 1/2021 | Fukushima | G06F 16/7837 |
| 2021/0094540 | A1* | 4/2021 | Bagschik | G06V 20/58 |
| 2021/0097147 | A1* | 4/2021 | DeVore | G06F 18/22 |
| 2021/0149195 | A1* | 5/2021 | Choi | G02B 13/16 |
| 2021/0158564 | A1* | 5/2021 | Chakravarty | G06T 7/73 |
| 2021/0201054 | A1* | 7/2021 | Toth | G01S 17/931 |
| 2021/0225099 | A1* | 7/2021 | Schmidt | B60R 11/04 |
| 2021/0255524 | A1* | 8/2021 | O'Connell | H04N 5/222 |
| 2021/0278837 | A1* | 9/2021 | Fairfield | G05D 1/0033 |
| 2021/0294944 | A1* | 9/2021 | Nassar | G06N 3/08 |
| 2021/0316669 | A1* | 10/2021 | Wang | G01S 17/86 |
| 2021/0354706 | A1* | 11/2021 | Yan | G01S 17/931 |
| 2021/0387643 | A1* | 12/2021 | Hari | B60W 30/095 |
| 2021/0389769 | A1* | 12/2021 | Hari | G05D 1/0214 |
| 2022/0050180 | A1* | 2/2022 | Krishnan | G01S 17/89 |
| 2022/0066031 | A1* | 3/2022 | Robertson, Jr. | B08B 5/02 |
| 2022/0086400 | A1* | 3/2022 | Sugawara | H04N 23/90 |
| 2022/0108049 | A1* | 4/2022 | Letwin | G08G 9/00 |
| 2022/0132004 | A1* | 4/2022 | Kanitz | B60W 60/001 |
| 2022/0141435 | A1* | 5/2022 | Zhang | G06T 3/40 |
| | | | | 348/745 |
| 2022/0179292 | A1* | 6/2022 | Hayasaka | G02B 7/09 |
| 2022/0185183 | A1* | 6/2022 | Kida | B60R 1/27 |
| 2022/0194395 | A1* | 6/2022 | Venkatadri | B60W 50/0205 |
| 2022/0207756 | A1* | 6/2022 | Ren | G06T 5/50 |
| 2022/0276709 | A1* | 9/2022 | MacNaughton | G06V 40/10 |
| 2022/0281469 | A1* | 9/2022 | Johnson | H04N 17/002 |
| 2022/0284627 | A1* | 9/2022 | Johnson | B60W 30/143 |
| 2022/0299844 | A1* | 9/2022 | O'Connell | G03B 15/00 |
| 2022/0301207 | A1* | 9/2022 | Guizilini | H04N 23/90 |
| 2022/0316923 | A1* | 10/2022 | Zethraeus | G02B 27/0006 |
| 2022/0355821 | A1* | 11/2022 | Ling | B60W 30/143 |
| 2022/0397421 | A1* | 12/2022 | Yoshida | G01C 21/3848 |
| 2022/0402444 | A1* | 12/2022 | Wang | H04N 23/54 |
| 2023/0058169 | A1* | 2/2023 | Cella | G06N 7/01 |
| 2023/0065761 | A1* | 3/2023 | Fukudome | B60W 40/06 |
| 2023/0079042 | A1* | 3/2023 | Yamazaki | B60K 35/53 |
| | | | | 434/66 |
| 2023/0084753 | A1* | 3/2023 | Yamazaki | G06F 3/015 |
| | | | | 434/66 |
| 2023/0087169 | A1* | 3/2023 | Muhassin | B60R 1/08 |
| | | | | 340/425.5 |
| 2023/0099481 | A1* | 3/2023 | Yuda | B60R 1/27 |
| | | | | 348/148 |
| 2023/0106268 | A1* | 4/2023 | Venkatesh | H04L 9/3213 |
| | | | | 701/23 |
| 2023/0135961 | A1* | 5/2023 | Hamilton | B60S 1/66 |
| | | | | 134/123 |
| 2023/0144745 | A1* | 5/2023 | Ulutan | G06N 3/044 |
| | | | | 382/104 |
| 2023/0150549 | A1* | 5/2023 | Morales Morales | G06N 3/006 |
| | | | | 701/23 |
| 2023/0176655 | A1* | 6/2023 | Kwon | H04M 1/725 |
| | | | | 340/407.2 |
| 2023/0202507 | A1* | 6/2023 | Chu | G06V 20/20 |
| | | | | 701/23 |
| 2023/0206499 | A1* | 6/2023 | Johnson | G06T 7/73 |
| | | | | 701/36 |

(56) References Cited

U.S. PATENT DOCUMENTS

| | | | |
|---|---|---|---|
| 2023/0211740 A1* | 7/2023 | LaCross | B60R 1/12 |
| | | | 348/148 |
| 2023/0244228 A1* | 8/2023 | Fairfield | B60W 60/007 |
| | | | 701/2 |
| 2023/0266440 A1* | 8/2023 | Acharya | G01S 17/931 |
| | | | 356/4.01 |
| 2023/0286532 A1* | 9/2023 | Gerrese | B60W 60/001 |
| 2023/0286539 A1* | 9/2023 | Malloch | G06V 10/82 |
| 2023/0288929 A1* | 9/2023 | Ding | G06N 3/08 |
| 2023/0290154 A1* | 9/2023 | Takaku | B60R 1/00 |
| 2023/0296730 A1* | 9/2023 | O'Donnell | G01S 7/4813 |
| | | | 356/4.01 |
| 2023/0302372 A1* | 9/2023 | Deuel | A63G 25/00 |
| 2023/0306852 A1* | 9/2023 | Magzimof | G08G 1/096775 |
| 2023/0311930 A1* | 10/2023 | Lasram | G01S 13/931 |
| | | | 701/2 |
| 2023/0311932 A1* | 10/2023 | Lasram | G07C 5/02 |
| 2023/0314156 A1* | 10/2023 | Yahata | G06T 15/00 |
| | | | 701/436 |
| 2023/0315935 A1* | 10/2023 | Bhatta | G06F 30/20 |
| | | | 703/2 |
| 2023/0322266 A1* | 10/2023 | Dicle | B60W 50/0097 |
| | | | 701/26 |
| 2023/0339492 A1* | 10/2023 | Hoh | B60W 50/14 |
| 2023/0339509 A1* | 10/2023 | Allan | G07C 5/008 |
| 2023/0343153 A1* | 10/2023 | Schlömicher | B60W 50/06 |
| 2023/0344955 A1* | 10/2023 | Okabe | H04N 5/272 |
| 2023/0347877 A1* | 11/2023 | Shalev-Shwartz | |
| | | | B60W 50/0097 |
| 2023/0347941 A1* | 11/2023 | Zeng | B60W 40/072 |
| 2023/0350399 A1* | 11/2023 | Huang | G05D 1/0088 |
| 2023/0351911 A1* | 11/2023 | Kim | G01S 13/931 |

* cited by examiner

SYSTEMS AND METHODS FOR TESTING VEHICLE SYSTEMS

INTRODUCTION

The present disclosure generally relates to systems and methods for testing vehicle systems.

Hardware-in-the-loop (HIL) simulation for vehicle systems includes a controller under test that is connected to a simulator. In vehicular test systems, a driving scenario is simulated by the simulator. Data output from the controller is read and used as feedback to the simulated driving scenario. In vehicle systems, a controller of a vehicle and associated hardware (e.g. control actuators) are connected to the simulator such that sensed variables associated with the control actuators and control commands are provided to the simulator for use in calculating forthcoming times steps of the simulation. The control actuators can include a steering system, a motor or brake devices. The controller thus operates in a largely virtual environment and can be tested in different situations in a safe and reproducible manner.

Autonomous and semi-autonomous vehicles are capable of sensing their environment and navigating based on the sensed environment. Such vehicles sense their environment using sensing devices such as radar, lidar, image sensors, and the like. The vehicle system further uses information from global positioning systems (GPS) technology, navigation systems, vehicle-to-vehicle communication, vehicle-to-infrastructure technology, and/or drive-by-wire systems to navigate the vehicle. Vehicle automation has been categorized into numerical levels ranging from Zero, corresponding to no automation with full human control, to Five, corresponding to full automation with no human control. Various automated driver-assistance systems, such as cruise control, adaptive cruise control, lane keeping control and parking assistance systems correspond to lower automation levels, while true "driverless" vehicles correspond to higher automation levels.

Some automated vehicular systems utilize a perception algorithm to detect, classify and describe external objects in the environment of the vehicle. A control algorithm of the vehicle may be responsive to the perceived objects to control one or more actuators of the vehicle. A HIL simulator may be connected to the perception algorithm, the control algorithm and the actuators to efficiently test the vehicle system. In this way, level one to five autonomous vehicle control algorithms and sensor models are exposed to a wide range of potentially complex driving scenarios in a virtual environment to assess the resulting vehicle level performance, for purposes of controls development and validation.

It has been found that the dynamic nature of the simulated driving scenarios can result in inaccurate features being extracted by the perception algorithm, particularly speed of objects and other motion parameters.

Accordingly, it is desirable to provide testing systems and methods for vehicle systems that allow motion parameters to be accurately extracted from simulated driving scenarios. Furthermore, other desirable features and characteristics of the present invention will become apparent from the subsequent detailed description and the appended claims, taken in conjunction with the accompanying drawings and the foregoing technical field and background.

SUMMARY

In one aspect, a method of testing a vehicle system is provided. The method includes generating, via at least one processor, a simulation of a driving scenario to provide simulation video data, displaying the simulation on a monitor using the simulation video data, capturing the displayed simulation using a camera system of the vehicle system to provide video data, processing, via the at least one processor, the video data using a perception algorithm to detect and track objects in the video data to provide perception data, controlling a vehicle actuator of the vehicle system in response to the perception data to provide command data, and adapting the simulation based on the command data. The camera system has a field of view and the monitor has a viewable area. The simulation of the driving scenario is scaled, via the at least one processor, in proportion to a ratio of the field of view of the camera projected onto the monitor and dimensions of the viewable area.

In embodiments, the camera system includes a vehicle camera and an external lens. In one embodiment, the camera is removably mounted in a bracket. The camera and the external lens may be mounted to the same bracket.

In embodiments, the bracket includes reference markers. In an embodiment, the method includes aligning the camera with a center of the monitor using the reference markers and a laser.

In embodiments, the bracket includes a through opening and an optical system of the camera is aligned with the through opening when the camera is mounted to the bracket, the reference markers are distributed about the through opening, the laser has a beam shaped to impinge upon the reference markers and the center of the monitor when the bracket is aligned with the center of the monitor such the when the camera is mounted to the bracket, the camera is aligned with the center of the monitor. The reference markers may include fins forming a cross shape and the laser beam may be cross-shaped. In one embodiment, aligning the camera comprises adjusting a vertical and horizontal position of the bracket.

In embodiments, a refresh rate of the monitor is at least 98 Hz.

In another aspect, a system for testing a vehicle system is provided. The system includes a monitor having a viewable area and a camera system of the vehicle system directed to capture video displayed on the monitor. The camera system has a field of view. The system further includes a vehicle actuator of the vehicle system and at least one processor in operable communication with the monitor, the camera system and the vehicle actuator. The at least one processor is configured to execute program instructions. The program instructions are configured to cause the at least one processor to: generate a simulation of a driving scenario to provide simulation video data, display the simulation on the monitor using the simulation video data, capture the displayed simulation using the camera system to provide video data, process the video data using a perception algorithm to detect and track objects in the video data to provide perception data, control the vehicle actuator in response to the perception data to provide command data, adapt the simulation based on the command data; and scale the simulation of the driving scenario in proportion to a ratio of the field of view of the camera projected onto the monitor and dimensions of the viewable area.

In embodiments, the camera system includes a vehicle camera and an external lens. The camera and the external lens may be mounted to a bracket. In an embodiment, the bracket includes reference markers, the system comprises a laser directed at a center of the monitor and the bracket includes a through opening. An optical system of the camera is aligned with the through opening when the camera is mounted to the bracket, the reference markers are distributed about the through opening, the laser has a beam shaped to impinge upon the reference markers and the center of the monitor when the bracket is aligned with the center of the monitor such the when the camera is mounted to the bracket, the camera is aligned with the center of the monitor. The reference markers may include fins forming a cross shape and the laser beam may be cross-shaped.

In embodiments, the system includes at least one adjustable table to which the bracket is mounted for adjusting a vertical and horizontal position of the bracket.

In embodiments, a refresh rate of the monitor is at least 98 Hz.

In embodiments, the actuator includes a braking device, and a brake sensor is associated with the braking device that provides braking data to adapt the simulation based on the braking data.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods described herein provide a camera HIL simulation system. The camera HIL simulation system is a set of processes and components that allow calibration and validation of a vehicle camera system in a virtual environment. A camera that is used in a vehicle is set up to point at a computer monitor. The setup uses a lens to focus the camera on the monitor. A 3D printed bracket is used to hold and position the camera in central alignment with the monitor. A simulation displayed on the monitor is scaled such that the scene displayed on the monitor is represented correctly according to a field of view of the camera.

The testing systems and methods described herein enable the use of an unmodified vehicle camera in a lab environment for highly accurate vehicle level calibration and validation. A bracket that holds the camera also holds an external lens. The bracket is designed using vehicle specific information and orients the center of the camera lens with the center of the external lens. The bracket also provides physical references in the form of fins placed at horizontal and vertical locations. These references allow for the camera, lens and monitor to be aligned. The external focusing lens is positioned at a specific distance from the monitor and collimates the light coming from it. This converts the close image to be in focus to an unmodified vehicle camera.

The simulated video content is scaled and cropped using an algorithmic tool created specifically for the task. The algorithmic tool takes camera specific and monitor specific measurements to calculate a simulated environment Field of View (FOV). The calculations using the tool results in a 1:1 size correlation between simulated objects and real objects as it pertains to the camera detection. This enables the simulation of dynamic events as they would be performed in a vehicle.

The systems and methods described herein allow extremely accurate dynamic performance in a lab environment.

Figure 1:
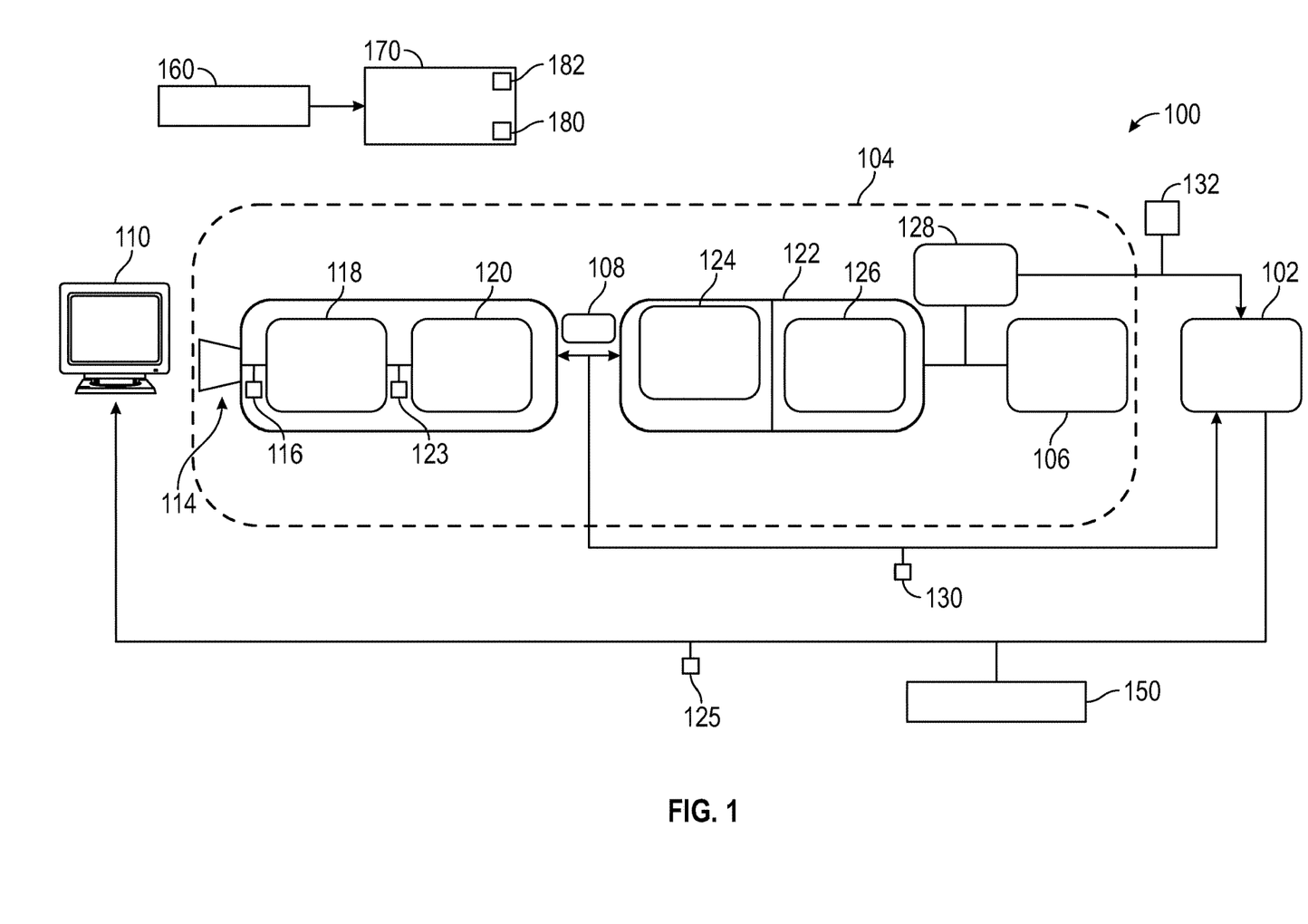
FIG. 1 is a functional block diagram illustrating a testing system, in accordance with various embodiments.

With reference to FIG. 1, a testing system shown generally at 100 is associated with a vehicle system 104 in accordance with various embodiments. In general, the testing system 100 includes a simulator 102 for generating a simulation of a driving scenario, a monitor 110 for display the simulation and a camera system 114 and associated perception algorithm 118 for detecting objects in the simulation.

The simulator 102 has access to an environment model 182 that is stored in computer memory 170. The environment model 182 includes software that is executed by a processor 160 of the simulator 102 to simulate a virtual driving environment and virtual objects in the virtual driving environment. The environment model 182 includes a large number of virtual objects and a subset of the virtual objects are moving. The moving virtual objects have a vector position and a velocity vector. The position of the moving virtual objects within the environment model is changed at each successive time step of the simulation according to the velocity vector. Exemplary moving virtual objects include vehicles. A state of the environment model 182 can be described by a vector which contain coordinates of all virtual objects and velocities of all moving virtual objects.

The simulator 102, the monitor 110, the vehicle system 104 and the camera system 114 are connected in a control loop. The simulator 102 provides the monitor 110 with simulation video data 112 and the monitor 110 displays the simulation included in the simulation video data 112. The camera system 114 captures the displayed simulation and captured video data 116 is interpreted by the perception algorithm 118 in the form of perception data 123. A control algorithm 120 is responsive to the perception data 123 to control one or more actuators 106 of the vehicle system 104 using command data 130. A sensor 128 is associated with the actuator 106 to provide sensed data 132. The command data 130 is fed back to the simulator 102 along with the sensed data 132. The simulator 102 adapts the state of the environment model 182 by simulating a reaction of the vehicle system 104 to the control commands based on the command data 130 and the sensed data 132.

The vehicle system 104 includes hardware and software under test including the camera system 114, the perception algorithm 118, a control algorithm 120, a Controller Area Network (CAN) or other bus 108, a control module 122 and one or more actuators 106.

The perception algorithm 118 may be embodied in a variety of ways to identify and describe location, classification and velocity of objects in the simulation displayed on the monitor 110 and captured by the camera system 114. The perception algorithm 118 receives captured video data 116 as an input from the camera system 114. For example, a neural network, such as a convolutional neural network, can be trained to identify the state of the target objects. Accordingly, the perception algorithm 118 includes artificial intelligence for detecting and extracting features describing target objects in the simulated environment. The artificial intelligence can be implemented with techniques, such as machine learning, deep learning, a neural network, a convolutional neural network (e.g., a ConvNet), a recurrent neural network, random forests, genetic algorithms, and reinforcement learning. The perception algorithm 118 outputs perception data 123 including features describing any detected target objects including such features as location, classification, velocity, motion trend, etc. The perception data 123 is time varying in that it changes as new frames of simulation video data 125 are displayed on the monitor 110.

The control module 122 includes a control algorithm 120 that can provide one of a variety of autonomous vehicle control capabilities. The control algorithm 120 receives perception data 123 and generates command data 130 to control one or more actuators 106 in response to the objects detected by the perception algorithm 118 and described in the perception data 123. One example, control algorithm 120 is that of automatic emergency braking, which assesses whether a collision with an object is likely and applies braking to avoid or reduce the impact of the collision. The control algorithm 120 may implement one or more other active safety features including forward collision warning, adaptive cruise control, lane departure warning, lane-keeping assist, blind spot monitoring, rear-cross traffic alert, etc. The control algorithm 120 may implement higher levels of automation including full driverless control. The control algorithm 120 can provide command data 130 describing braking, steering and/or propulsion commands.

The control algorithm 120 may pass the command data 130 to an actuator specific control module 122. In an exemplary embodiment of FIG. 1, the control module 122 is an Electronic Brake Control Module (EBCM), which includes an actuator control algorithm 124 and a valve body 126 for controlling hydraulic application of brake pressure to the actuator 106 (which is a caliper and rotor in the present embodiment) based on the commanded braking operation described in the command data 130. It should be appreciated that alternative and additional control modules 122 may be included in the vehicle system 104 including steering and propulsion control modules and associated hardware. The sensor 128 is associated with the one or more actuators to measure parameters such as brake pressure, steering angle, wheel speed, etc. The sensor 128 produces sensed data 132 describing the measured parameters.

The sensed data 132 and the command data 130 are provided to the simulator 102. The simulator 102 is responsive to the provided sensed data 132 and command data 130 by changing relative location and speed of the host vehicle and virtual objects in the environment model that is maintained by the simulator 102. Accordingly, steering, propulsion and/or braking information included in the sensed data 132 and the command data 130 results in corresponding changes to the velocity and location of the host vehicle in the environment model 182 provided by the simulator 102.

The testing system 100 includes one or more processors 160 and memory 170 in the form of a computer readable storage device or media. The processor 160 can be any custom made or commercially available processor, a central processing unit (CPU), a graphics processing unit (GPU), an auxiliary processor among several processors associated with the testing system 100, a semiconductor based microprocessor (in the form of a microchip or chip set), a macroprocessor, any combination thereof, or generally any device for executing instructions. The memory 170 may include volatile and nonvolatile storage in read-only memory (ROM), random-access memory (RAM), and keep-alive memory (KAM), for example. KAM is a persistent or non-volatile memory that may be used to store various operating variables while the processor 160 is powered down. The memory 170 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 160 in controlling the testing system.

The memory 170 stores one or more computer program(s) 180 providing instructions that may include one or more separate programs, each of which comprises an ordered listing of executable instructions for implementing logical functions. The instructions, when executed by the processor 16 perform logic, calculations, methods and/or algorithms of the testing system 100. Although only one processor 160 is shown in FIG. 1, embodiments of the testing system 100 can include any number of processors 160 that communicate over any suitable communication medium or a combination of communication mediums and that cooperate to perform logic, calculations, methods, and/or algorithms, and generate control signals to execute the testing system 100. The computer program(s) particularly provide instructions for the processor 160 to execute the perception algorithm 118, the control algorithm 120, the control module 122, the simulator 102 and the scaling module 150.

It has been found that there are latencies involved in the simulation that would not be present in a real vehicle. Such latencies can result in errors in detection of dynamic variables such as velocities of moving objects in the simulation. Whilst the processing chain from the perception algorithm 118 to activating the actuator 106 is the same as a real vehicle in terms of time, the simulator 102 introduces delays in generating, sending and rendering the simulation video data 112 and time from when the sensor 128 sends the sensed data 132 to the simulator 102. In order to mitigate these latencies to provide a more realistic simulation, the monitor 110 is selected to have a refresh rate of at least 98 Hz and optionally at least 120 Hz. A cable connecting the simulator 102 should support required bandwidth to refresh the monitor 110 at such rates. Anti-tearing features of the monitor (such as gSYNC/Freesync) are disabled. The simulator 102 provides simulation video data at a sufficiently high frame rate. The monitor 110 may be a Liquid Crystal Display (LCD) monitor 110 and may be an In-Plane Switching (IPS) monitor 110.

Figure 2:
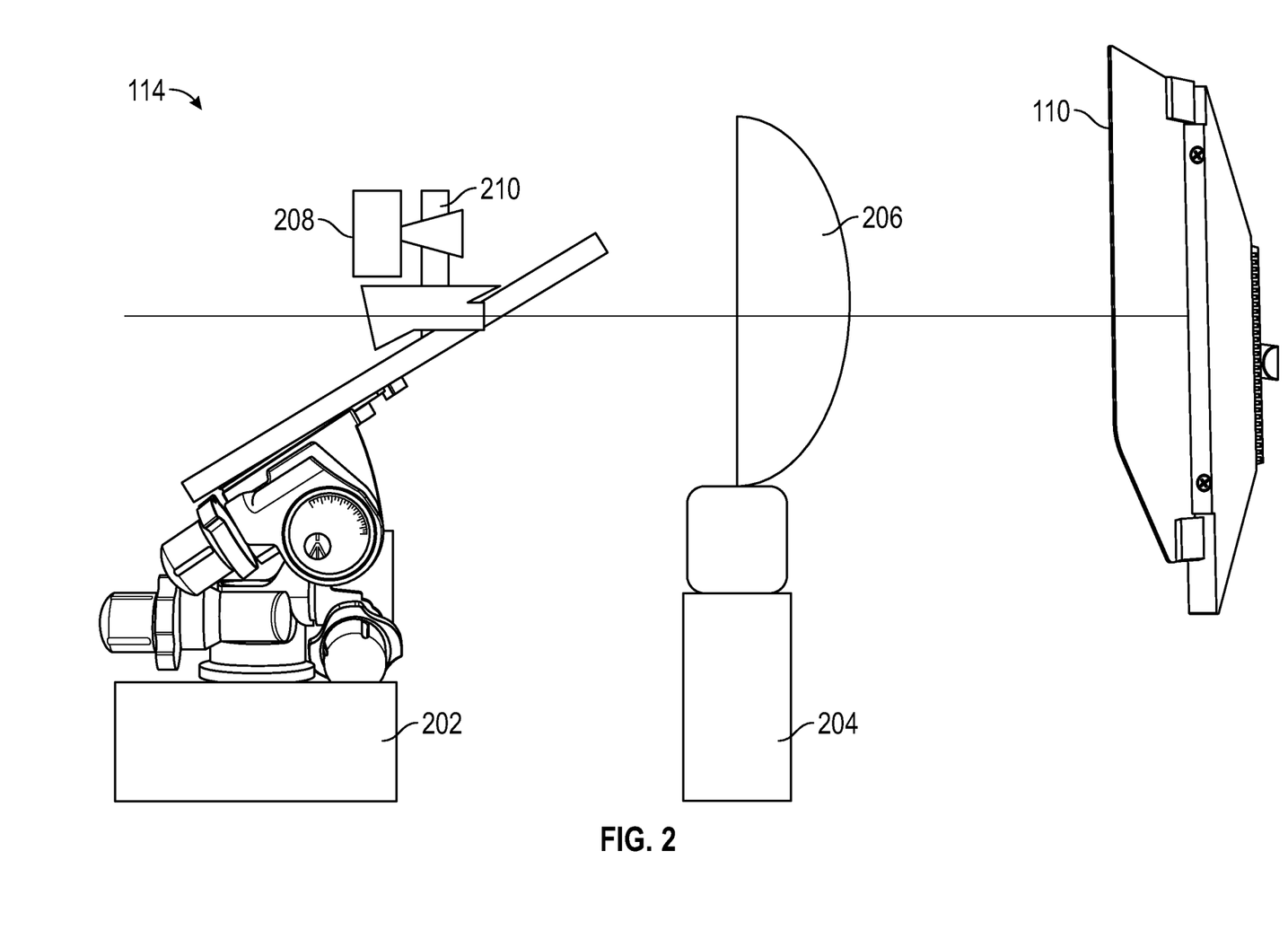
FIG. 2 is a diagram illustrating a camera system and a monitor, in accordance with various embodiments.

FIG. 2 illustrates a functional diagram of a camera system 114 in accordance with various embodiments. The camera system 114 includes a camera 208, a bracket 210, an external lens 206, a first adjustment table 202 and a second adjustment table 204. The camera 208 is removably mounted to the bracket 210. The camera 208 is an actual optical camera that is to be used in a vehicle. As such, the camera 208 does not have a view finder. The bracket 210 is custom made to fit with the camera 208. The bracket may be 3D printed. The external lens 206 is located between the camera 208 and the monitor 110. The camera 208 has an internal optical system (not shown) that is focused on infinity whereas the external lens 206 collimates and focuses light from the monitor 110 to allow the monitor and the camera 208 to be located in proximity to one another in a bench top environment. The external lens 206 may have a focal distance of around 100 mm, 200 mm, 300 mm or 400 mm. In the embodiment of FIG. 2, the first adjustment table 202 and the second adjustment table 204 allow the camera 208 and the external lens 206 to be moved vertically and horizontally relative to the monitor 110 to allow alignment with a center point of the monitor 110. The first and second adjustment tables 202, 204 allow the external lens 206 and the camera 208 to be horizontally moved relative to one another. As described with reference to FIGS. 3 to 7 below, the external lens 206 and the camera 208 may be mounted to the same bracket 210 in other embodiments. In such embodiments, one adjustment table can be provided to move the external lens 206 and the camera 208 in concert relative to the monitor 110.

Figure 3:
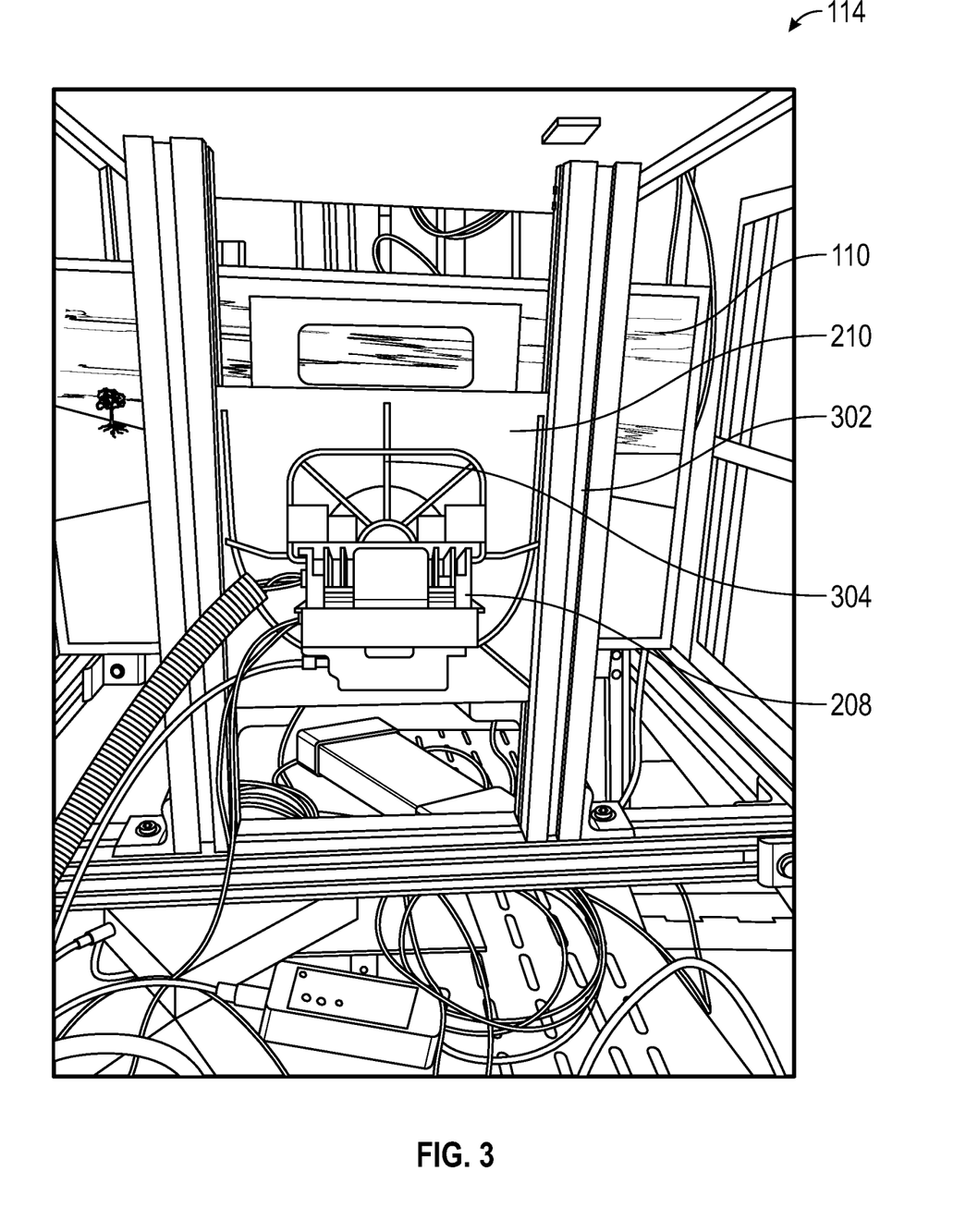
FIGS. 3 to 7 illustrate a camera system mounted to a bracket, in accordance with various embodiments.
Figure 4:
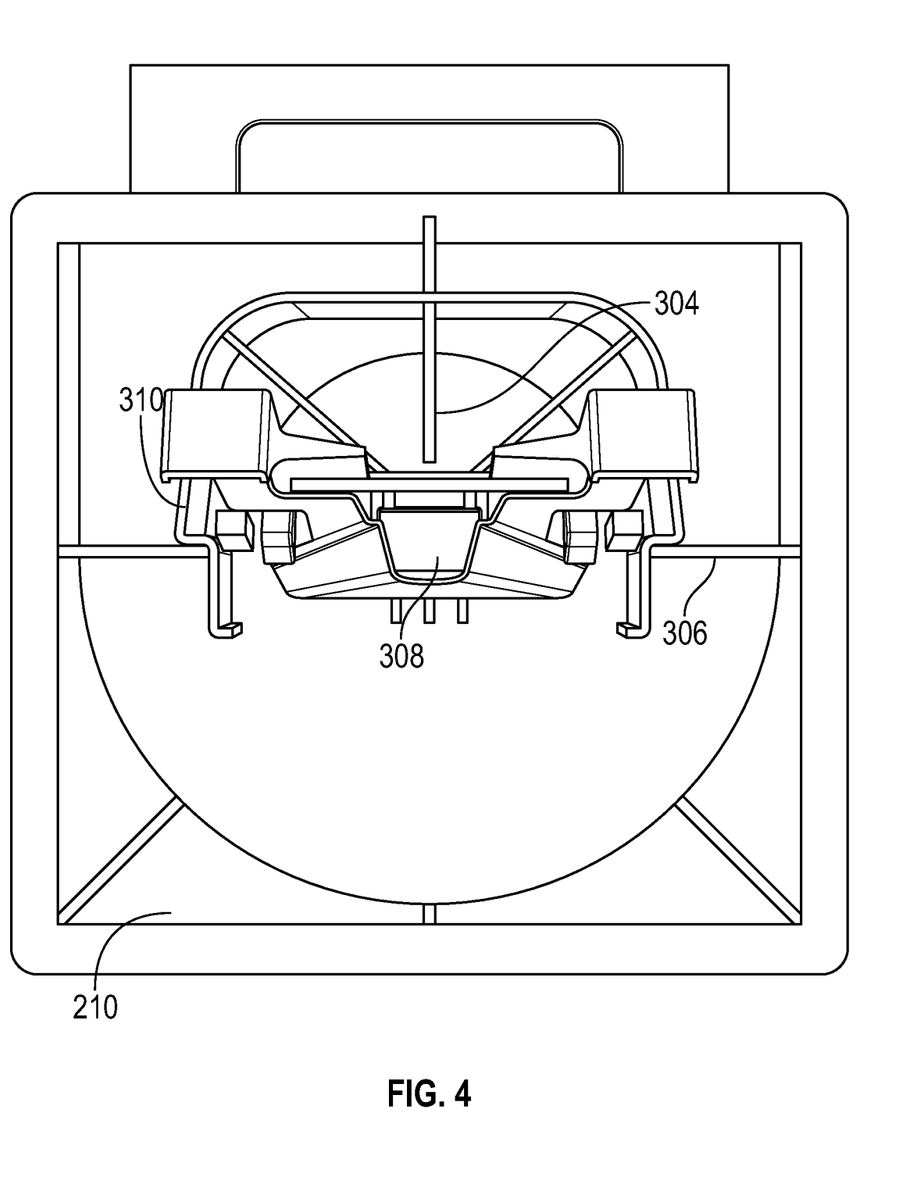
Figure 5:
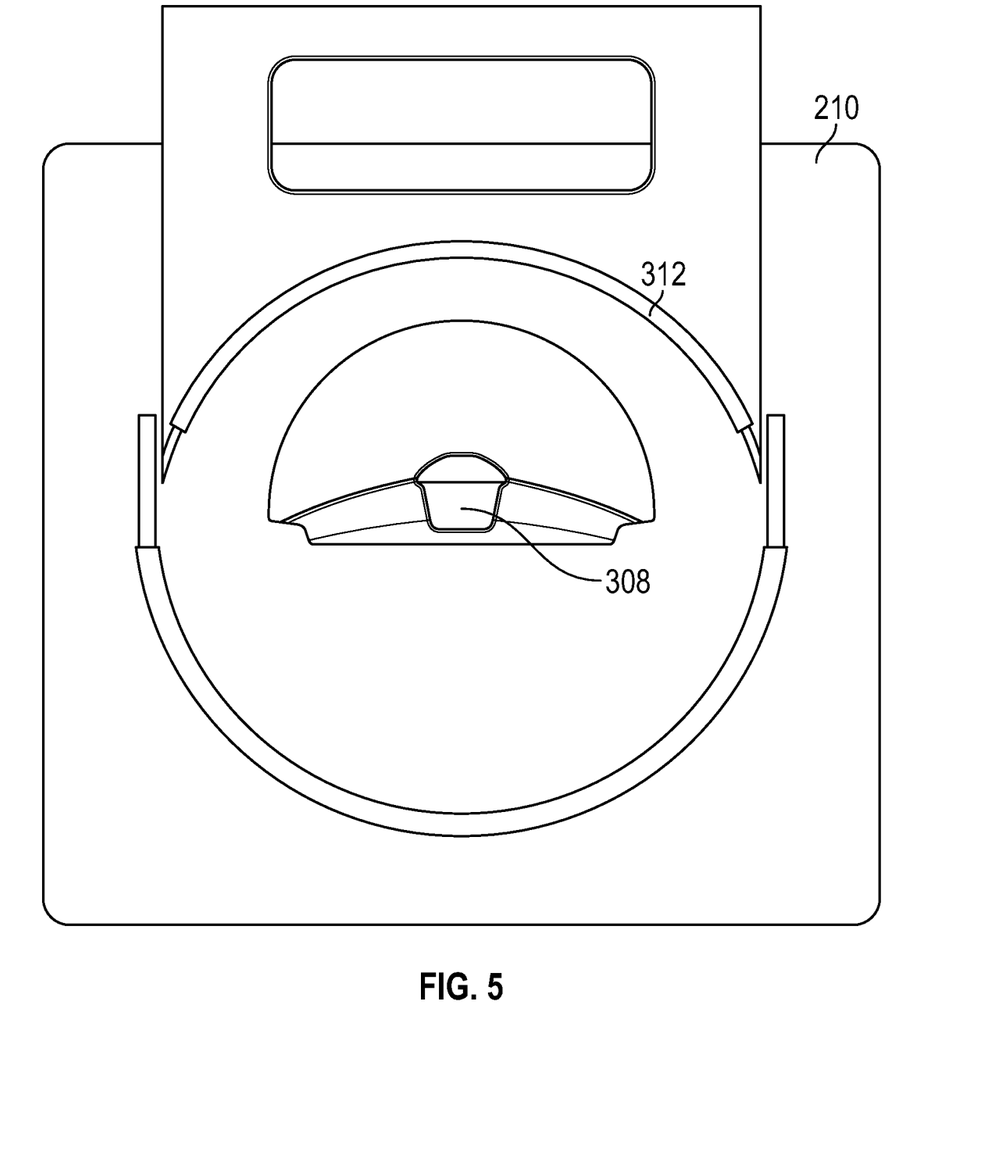
Figure 6:
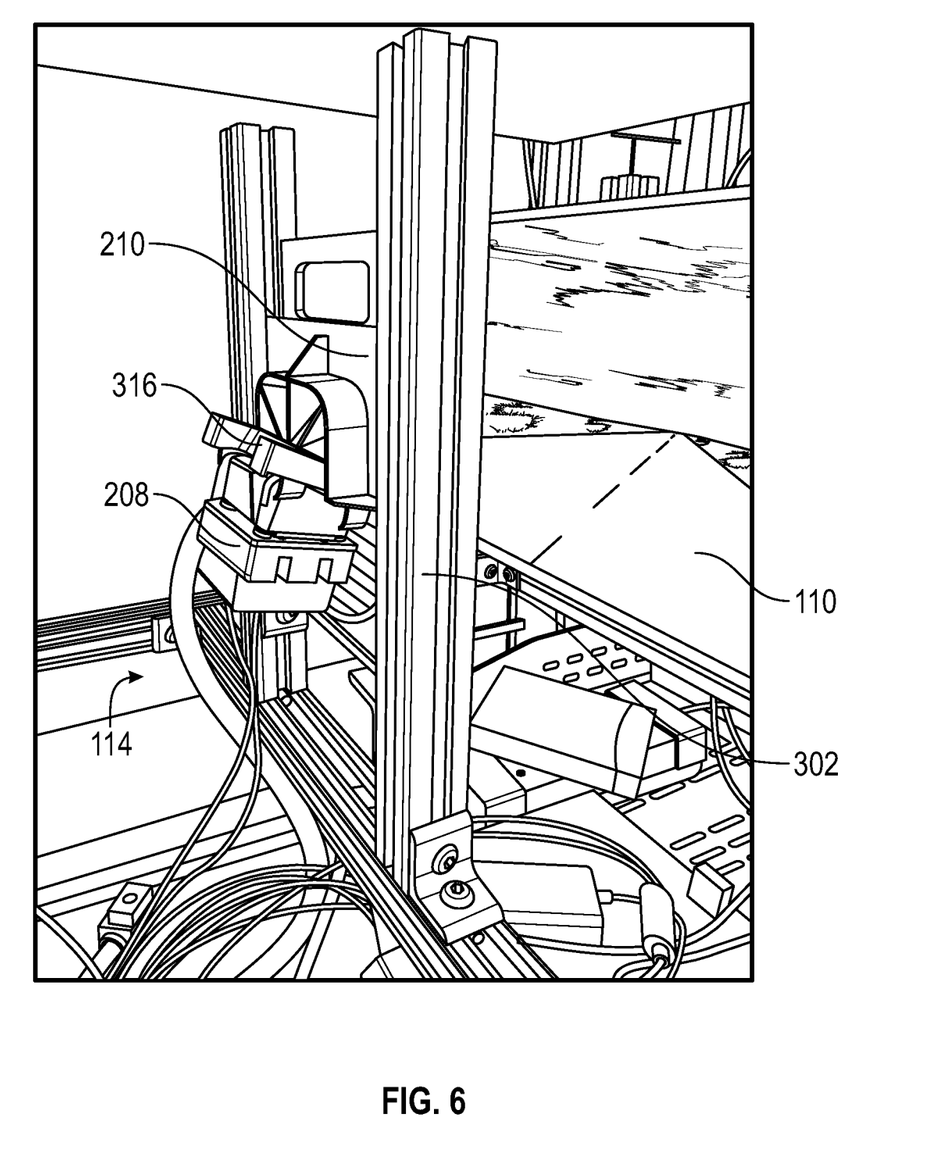
Figure 7:
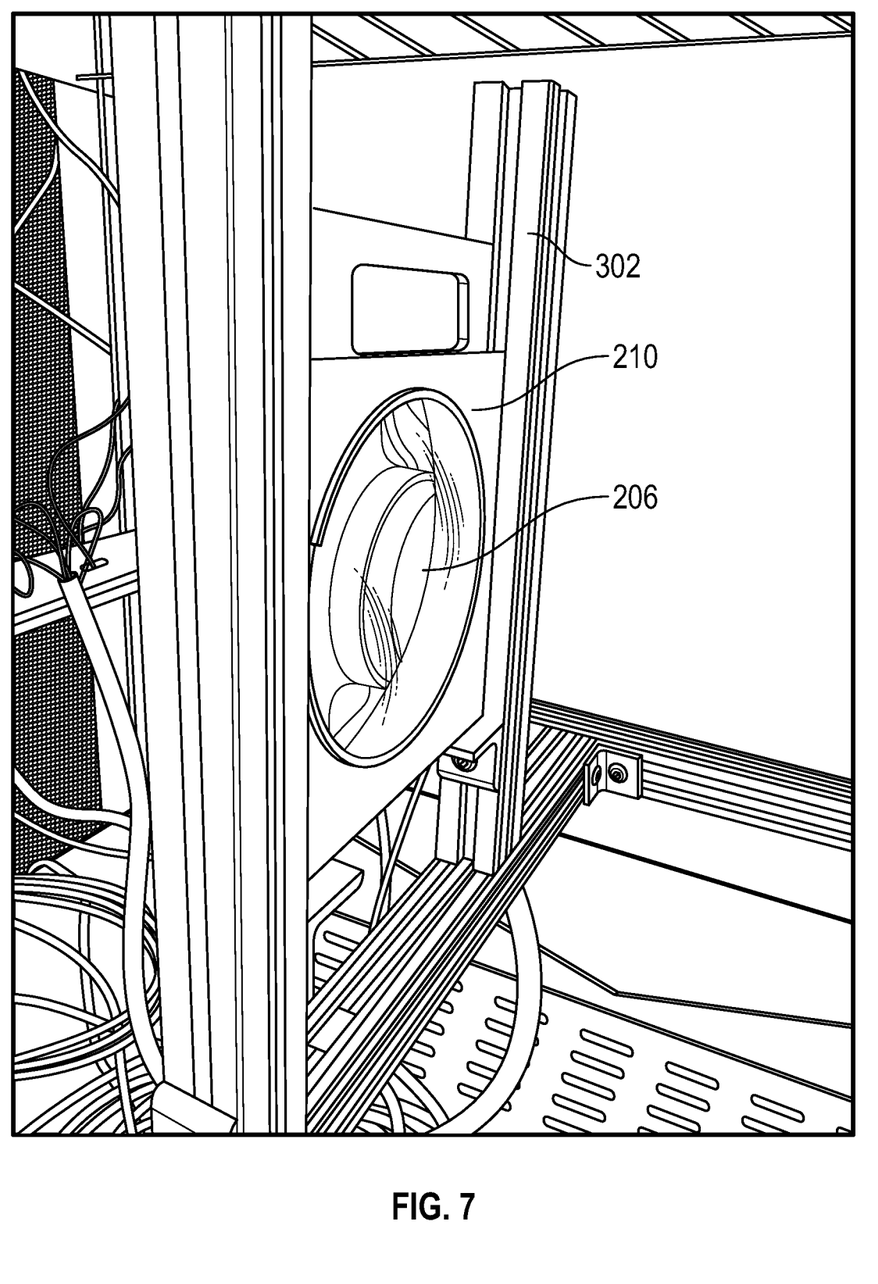

An exemplary embodiment of the camera system 114 and a bracket 210 to which the camera 208 is mounted is shown in FIGS. 3 to 7. FIG. 3 illustrates a rear view of the bracket 210 with the camera 208 mounted thereto. FIG. 4 provides a rear view with the camera 208 removed. FIG. 5 provides a front view of the bracket 210. FIG. 6 shows a side view of the camera system 114. FIG. 7 provides another front view of the bracket 210. The bracket 210 is custom made for the camera 208 with mounting arms 310 that vertically support the camera 208 and also fix the camera 208 in a front to rear direction. When mounted to the bracket 210, a barrel of the camera 208 including an internal optical system is aligned with a through opening 308 of the bracket 210 to allow the camera 208 to view the monitor 110 through the bracket 210. On a front side of the bracket 210, lens mounting structure 312 is provided to which the external lens 206 can be fixed. The lens mounting structure 312 and the mounting arms 310 are made so that the through opening 308 and an optical axis of the camera 208 are centrally aligned with a center of the external lens 206.

A rear side of the bracket 210 is provided with reference markers, which are in the form of one or more horizontal fins 306 and one or more vertical fins 304 in the present embodiment. Other forms of reference markers are contemplated such as reference points and other angled reference lines. The horizontal fin 306 and the vertical fin 304 are directed so that imaginary straight lines extending along the respective fins 304, 306 would intersect at the optical axis of the camera 208 (and a central point of the through opening 308).

The bracket 210 is mounted to a frame 302, which is connected to, or part of, an adjustment table (not shown) to allow the camera 208 and the bracket 210 to be horizontally and vertically re-positioned. In order to align the camera 208 with a center point of the monitor 110, the camera 208 is removed. A laser beam is directed through the through opening 308 of the bracket 210 and a center point (e.g. a central pixel) of the monitor 110 is displayed on the monitor 110. The laser beam extends horizontally and is directed at the center point of the monitor. The laser beam may be cross-shaped so as to align with the horizontal and vertical fins 304, 306. When other forms of references markers are used, the laser beam shape will be correspondingly formed. The bracket 210 is moved by adjustment of the adjustment table to align the laser beam with the reference markers. When the alignment is achieved, a field of view of the camera 208 (and its optical axis) is geometrically centralized with the monitor 110. This precise central alignment has been found to be important for accurately detecting dynamic parameters associated with moving objects in the simulation.

Figure 8:
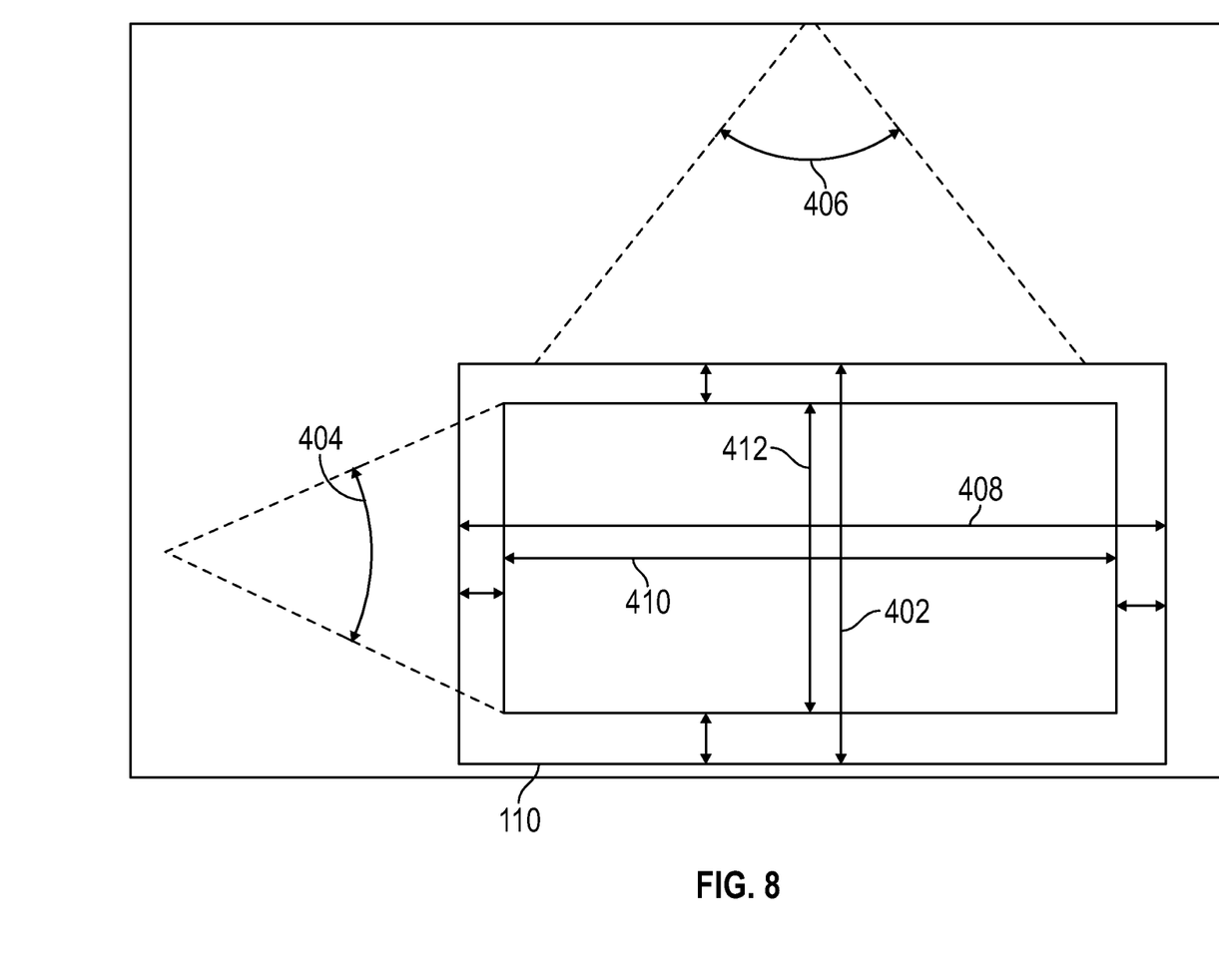
FIG. 8 illustrates parameters associated with scaling a simulation video, in accordance with various embodiments.

It has also been found that matching the scale of the simulation with the field of view of the camera 208 is an important consideration in ensuring dynamic parameters associated with moving objects in the simulation are accurately detected. FIG. 8 shows a portion of the monitor 110 that is viewed by the camera 208, which portion is represented by the vertical projection 412 and the horizontal projection 410 of the vertical FOV 404 and the horizontal FOV 406. A total image that the simulator 102 renders on a screen of the monitor 110 is represented by the vertical viewable area 402 and the horizontal viewable area 408. The testing system 100 of FIG. 1 includes a scaling module 150, which is a software tool that calculates vertical and horizontal dimensions of the video shown on the monitor so that the camera system 114 can perceive the images proportionally correct to how the scene would be seen in a vehicle. The calculations performed by the scaling module 150 can be explained with reference to a simplified diagram shown in FIG. 9. The camera system 114 views 7 lines as shown by the camera FOV 504 and the simulation is scaled to display 11 lines with the same spacing. The following equation 1 is used to obtain a simulation FOV 502 that will display 11 linear lines at a correct scale for the 7 lines included in the camera FOV 504.

Figure 9:
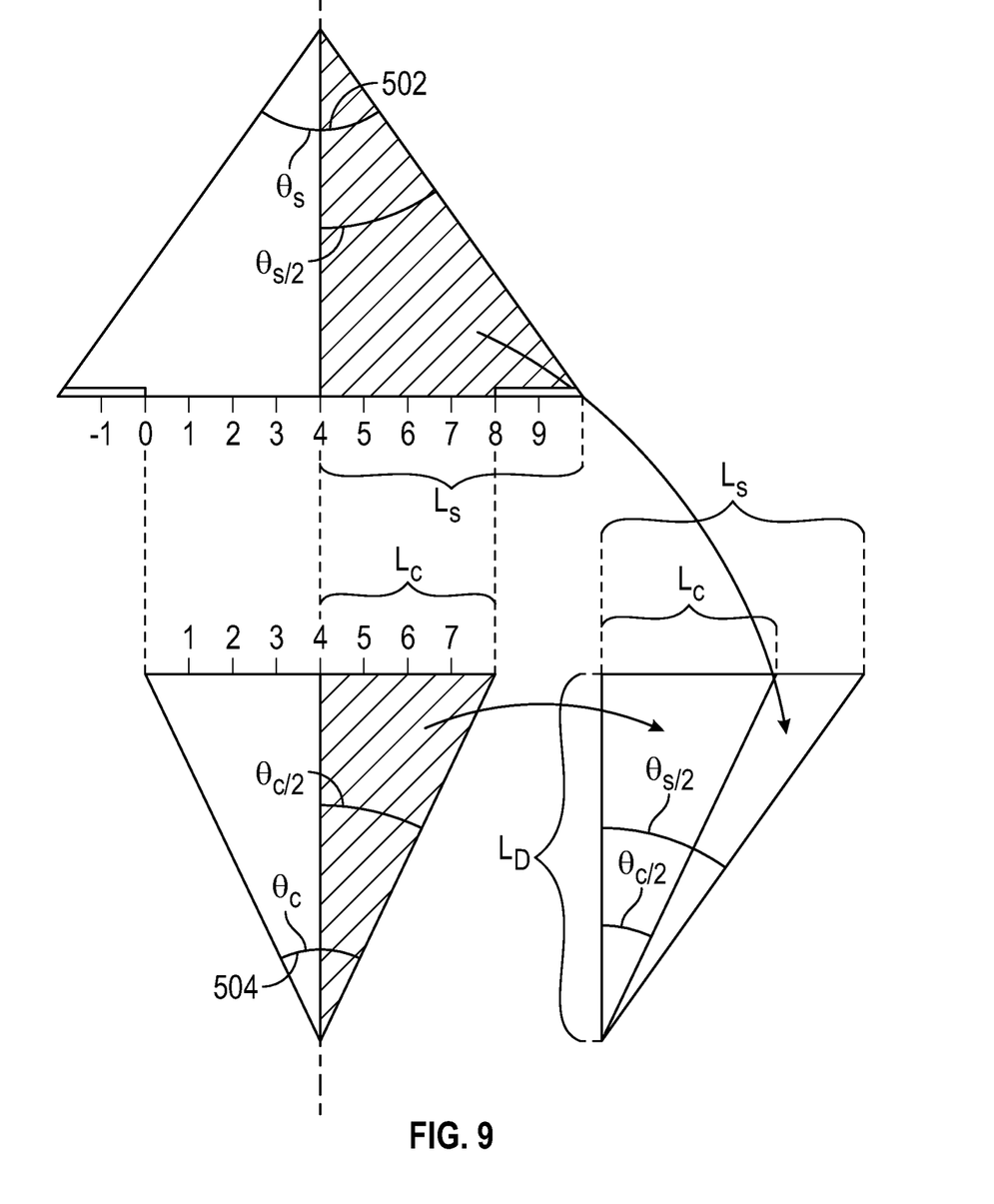
FIG. 9 illustrates a calculation for scaling a simulation video, in accordance with various embodiments.

The simulation FOV 502 is calculated using a ratio of the camera FOV ($\theta_c$) projected onto a flat plane ($L_c$) of a screen of the monitor 110 to an actual screen length ($L_s$) of the projected simulation FOV 502 ($\theta_s$). This scaling operation is performed for both dimensions (horizontal and vertical) independently. The scaling module 150 thus receives, as inputs, the camera FOV 504 (in both dimensions) $\theta_c$ and a linear measurement of the dimensions of the monitor 110. Based on a ratio between a viewable area of the monitor 110 and the camera FOV 504 projected onto the monitor 110, the video being sent to the monitor 110 in the form of simulation video data 125 is scaled proportionally by the scaling module 150. With reference to FIG. 9, an exemplary equation for calculating the simulation FOV 502 is:

$$\theta_s = 2\tan^{-1}\left(\frac{L_s}{L_c}\frac{\tan\theta_c}{2}\right) \quad \text{(equation 1)}$$

The simulation FOV 502 determined by equation 1 corresponds to the scaling required to match with the camera FOV 504 to ensure that the simulation is correctly viewed by the camera system 114. The actual rendering of the simulation video data 125 on a screen of the monitor 110 is edge to edge although the camera system 114 only views a middle section.

Figure 10:
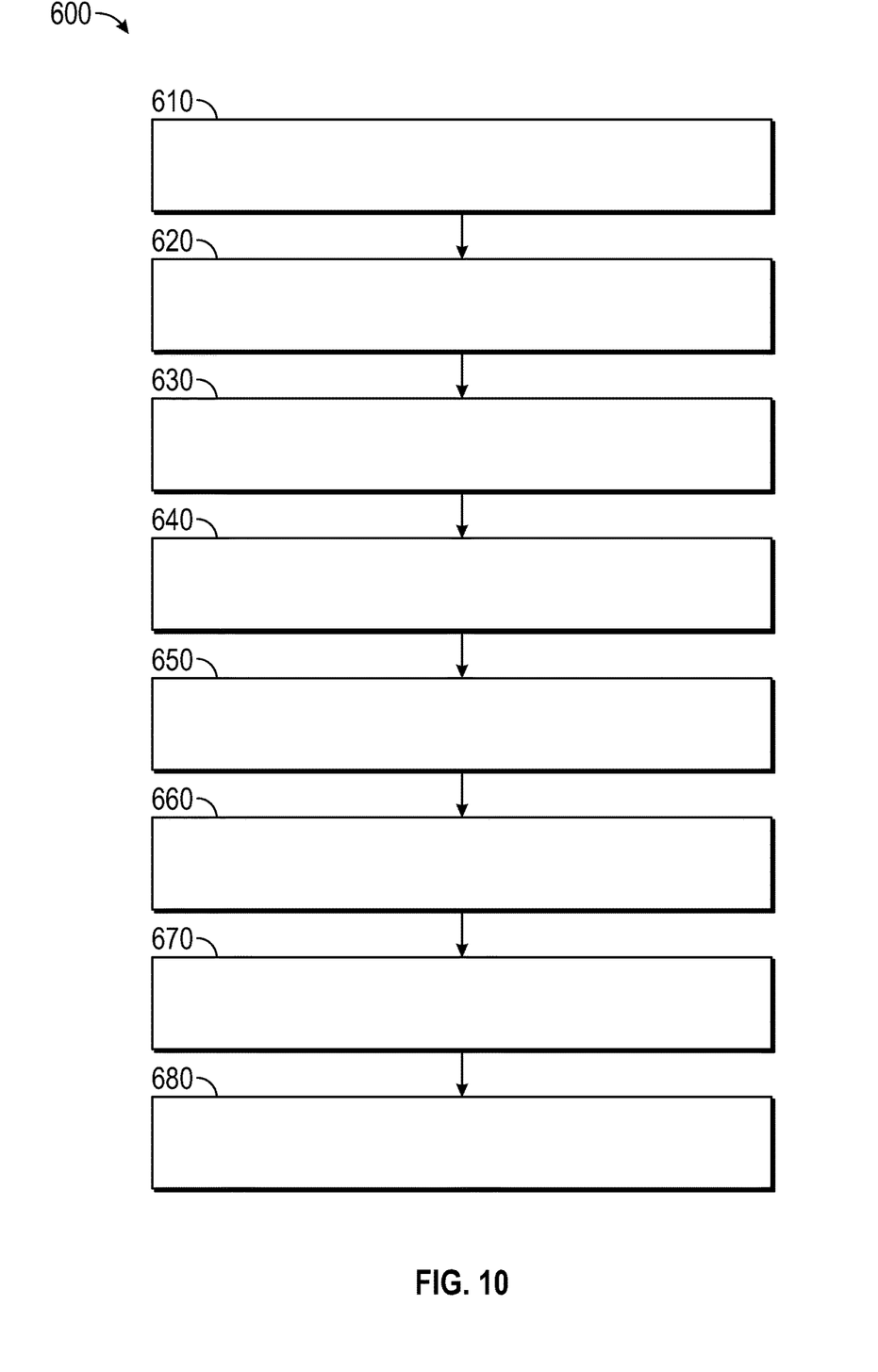
FIG. 10 is a flowchart illustrating method steps for testing a vehicle system, in accordance with various embodiments.

Referring now to FIG. 10, and with continued reference to FIGS. 1-9, a flowchart illustrates a method 600 of testing a vehicle system 104, in accordance with the present disclosure. As can be appreciated in light of the disclosure, the order of operation within the method is not limited to the sequential execution as illustrated in FIG. 10, but may be performed in one or more varying orders as applicable and in accordance with the present disclosure.

In step 610, the camera system 114 is aligned with a center of the monitor 110. To do so, a laser beam is directed at a center of the monitor 110 by pointing a center of the laser beam at a central marker displayed on the monitor 110. The bracket 210 is vertically and horizontally adjusted in position to a location where the laser beam is aligned with reference markers on the bracket 210, optionally using one or more adjustment tables. The reference markers may be in the form of horizontal and vertical fins 304, 306 and the laser beam may be correspondingly cross shaped. After the calibration alignment is performed, the bracket 210 is positioned so that the camera 208, when mounted to the bracket 210, has its optical axis aligned with a dead center of the monitor 110.

In step 620, a simulation of a driving scenario is generated by the simulator 102. The simulation video data 125 output by the simulator 102 is provided to the scaling module 150. The simulation is scaled in step 630 in proportion to a ratio of dimensions of a viewable area of the monitor 110 to a field of view of the camera 208 projected onto a flat plane of the monitor 110. The scaled simulation is displayed on the monitor 110 in step 640. The refresh rate of the monitor 110 is at least 98 Hz and the frames per second of the simulation video data 125 should be at least as high.

The scaled simulation displayed on the monitor 110 is captured by the camera system 114 in step 650. Perception processing is applied in step 660 by the perception algorithm 118. One or more vehicle actuators 106 are controlled by the control module 122 in response to objects detected by the perception algorithm. Command data 130 provided by the control algorithm 120 and sensed data 132 associated with the controlled actuator 106 is fed back to the simulator 102 in step 680 to update position and velocity of the vehicle being modelled by the simulator 102 relative to other objects in the simulation.

A performance analysis on the testing system 100 described herein has shown that velocity of detected objects extracted by the perception algorithm 118 substantially match that of the simulated moving objects.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of testing a vehicle system, the method comprising:
    generating, via at least one processor, a simulation of a driving scenario to provide simulation video data;
    displaying the simulation on a monitor using the simulation video data;
    capturing the displayed simulation using a camera of the vehicle system to provide video data;
    processing, via the at least one processor, the video data using a perception algorithm to detect and track objects in the video data to provide perception data;
    controlling a vehicle actuator of the vehicle system in response to the perception data to provide command data; and
    adapting the simulation based on the command data;
    wherein the camera has a field of view and the monitor has a viewable area and wherein the simulation of the driving scenario is scaled, via the at least one processor, in proportion to a ratio of the field of view of the camera projected onto the monitor and dimensions of the viewable area, wherein the vehicle camera is removably mounted in a bracket, wherein the bracket includes a through opening and an optical system of the camera is aligned with the through opening when the vehicle camera is mounted to the bracket, reference markers are distributed about the through opening, wherein the bracket includes the reference markers, the laser has a beam shaped to impinge upon the reference markers and the center of the monitor when the bracket is aligned with the center of the monitor such the when the vehicle camera is mounted to the bracket, the vehicle camera is aligned with the center of the monitor.

2. The method of claim 1, wherein the camera includes a vehicle camera and an external lens.

3. The method of claim 2, wherein the vehicle camera and the external lens are mounted to the same bracket.

4. The method of claim 1, comprising aligning the vehicle camera with a center of the monitor using the reference markers and a laser.

5. The method of claim 4, wherein aligning the vehicle camera comprises adjusting a vertical and horizontal position of the bracket.

6. The method of claim 1, wherein the reference markers include fins forming a cross shape and the laser beam is cross-shaped.

7. The method of claim 1, wherein a refresh rate of the monitor is at least 98 Hz.

8. A system for testing a vehicle system, the system comprising:
    a monitor having a viewable area;
    a camera system of the vehicle system directed to capture video displayed on the monitor, wherein the camera system has a field of view, and wherein the camera system includes a vehicle camera and an external lens that are mounted to a bracket, wherein the bracket includes reference markers;

a vehicle actuator of the vehicle system;

at least one processor in operable communication with the monitor, the camera system and the vehicle actuator, wherein the at least one processor is configured to execute program instructions, wherein the program instructions are configured to cause the at least one processor to:

generate a simulation of a driving scenario to provide simulation video data;

display the simulation on the monitor using the simulation video data;

capture the displayed simulation using the camera system to provide video data;

process the video data using a perception algorithm to detect and track objects in the video data to provide perception data;

control the vehicle actuator in response to the perception data to provide command data;

adapt the simulation based on the command data; and scale the simulation of the driving scenario in proportion to a ratio of the field of view of the camera projected onto the monitor and dimensions of the viewable area, and a laser directed at a center of the monitor and the bracket includes a through opening and an optical system of the vehicle camera is aligned with the through opening when the vehicle camera is mounted to the bracket, the reference markers are distributed about the through opening, the laser has a beam shaped to impinge upon the reference markers and the center of the monitor when the bracket is aligned with the center of the monitor such the when the vehicle camera is mounted to the bracket, the vehicle camera is aligned with the center of the monitor.

9. The system of claim 8, wherein the reference markers include fins forming a cross shape and the laser beam is cross-shaped.

10. The system of claim 8, comprising at least one adjustable table to which the bracket is mounted for adjusting a vertical and horizontal position of the bracket.

11. The system of claim 8, wherein a refresh rate of the monitor is at least 98 Hz.

12. The system of claim 8, wherein the actuator comprises a braking device and a brake sensor is associated with the braking device that provides braking data to adapt the simulation based on the braking data.

* * * * *